US008996713B2

(12) United States Patent
Nilsson et al.

(10) Patent No.: US 8,996,713 B2
(45) Date of Patent: Mar. 31, 2015

(54) VIDEO STREAMING

(75) Inventors: Michael Erling Nilsson, London (GB); Ian Barry Crabtree, London (GB); Stephen Clifford Appleby, London (GB); Rory Stewart Turnbull, London (GB)

(73) Assignee: British Telecommunications Public Limited Company, London (GB)

( * ) Notice: Subject to any disclaimer, the term of this patent is extended or adjusted under 35 U.S.C. 154(b) by 326 days.

(21) Appl. No.: 13/807,868

(22) PCT Filed: May 27, 2011

(86) PCT No.: PCT/GB2011/000821
§ 371 (c)(1),
(2), (4) Date: Dec. 31, 2012

(87) PCT Pub. No.: WO2012/001339
PCT Pub. Date: Jan. 5, 2012

(65) Prior Publication Data
US 2013/0111060 A1    May 2, 2013

(30) Foreign Application Priority Data

Jun. 30, 2010 (GB) .................................. 1011047.6
Jul. 12, 2010 (GB) .................................. 10251246.4

(51) Int. Cl.
*H04L 29/06* (2006.01)
*H04N 21/234* (2011.01)
(Continued)

(52) U.S. Cl.
CPC ........ *H04L 65/602* (2013.01); *H04N 21/23406* (2013.01); *H04N 21/23424* (2013.01);
(Continued)

(58) Field of Classification Search
CPC .......... H34N 7/26; H04L 29/06; H04L 23/00; H04N 21/2343; H04N 21/24; H04N 21/234; H04N 21/44
USPC .................. 709/231, 219, 217, 227; 375/370, 375/E7.023, 240.2, E7.014, E7.025, 375/E7.026, E7.211; 725/95
See application file for complete search history.

(56) References Cited

U.S. PATENT DOCUMENTS

2004/0049793 A1   3/2004   Chou
2005/0015246 A1   1/2005   Thumpudi et al.
(Continued)

FOREIGN PATENT DOCUMENTS

EP   1 298 931   4/2003
EP   1 395 000   3/2004
(Continued)

OTHER PUBLICATIONS

International Search Report for PCT/GB2011/000821 mailed Jul. 13, 2011.
(Continued)

*Primary Examiner* — Fan Ng
*Assistant Examiner* — Christopher Cadorna
(74) *Attorney, Agent, or Firm* — Nixon & Vanderhye PC

(57) ABSTRACT

The network contains one or more network based video servers connected to one or more video receivers over a shared network. Multiple pieces of video content are each encoded at a number of constant quality levels and stored on one or more of the network based servers. In response to requests from a receiver, video content is selected on a server and delivered over the shared network to the receiver. The system selects the quality level of the stream to deliver based on characteristics of the video stream currently being delivered, and the number of bits already buffered at the video receiver and the available network throughput. The aim is to select the video quality being delivered according to the available network throughput so as maximise the quality while ensuring that all video data is delivered over the network in time for it to be decoded and displayed without interruption.

9 Claims, 13 Drawing Sheets

(51) Int. Cl.
*H04N 21/2343* (2011.01)
*H04N 21/24* (2011.01)
*H04N 21/2662* (2011.01)
*H04N 21/44* (2011.01)
*H04N 21/442* (2011.01)
*H04N 21/462* (2011.01)
*H04N 19/15* (2014.01)
*H04N 19/102* (2014.01)
*H04N 19/61* (2014.01)
*H04N 19/154* (2014.01)
*H04N 19/164* (2014.01)
*H04N 19/177* (2014.01)

(52) U.S. Cl.
CPC ..... *H04N21/23439* (2013.01); *H04N 21/2401* (2013.01); *H04N 21/2402* (2013.01); *H04N 21/2662* (2013.01); *H04N 21/44004* (2013.01); *H04N 21/44016* (2013.01); *H04N 21/44209* (2013.01); *H04N 21/4621* (2013.01); *H04L 65/4084* (2013.01); *H04L 65/80* (2013.01); *H04N 19/15* (2014.11); *H04N 19/102* (2014.11); *H04N 19/61* (2014.11); *H04N 19/154* (2014.11); *H04N 19/164* (2014.11); *H04N 19/177* (2014.11)
USPC ........................................................ 709/231

(56) References Cited

U.S. PATENT DOCUMENTS

| | | | |
|---|---|---|---|
| 2005/0201485 A1 | 9/2005 | Fay | |
| 2006/0045180 A1* | 3/2006 | Ghanbari et al. | 375/240.03 |
| 2006/0075446 A1 | 4/2006 | Klemets et al. | |
| 2006/0095401 A1 | 5/2006 | Krikorian et al. | |
| 2008/0209490 A1* | 8/2008 | Dankworth et al. | 725/112 |
| 2010/0128604 A1 | 5/2010 | Appleby et al. | |
| 2010/0146145 A1 | 6/2010 | Tippin et al. | |
| 2011/0066673 A1* | 3/2011 | Outlaw | 709/203 |

FOREIGN PATENT DOCUMENTS

| | | |
|---|---|---|
| EP | 1 641 271 | 3/2006 |
| WO | WO 00/35201 | 6/2000 |
| WO | WO 03/084172 | 10/2003 |
| WO | 2004/047455 | 6/2004 |
| WO | WO 2004/047455 | 6/2004 |
| WO | 2005/093995 | 10/2005 |
| WO | 2008/119954 | 10/2008 |
| WO | WO 2008/119954 | 10/2008 |
| WO | 2009/112801 | 9/2009 |
| WO | 2010/067050 | 6/2010 |

OTHER PUBLICATIONS

B. Crabtree et al., "Equitable Quality Video Streaming", Consumer Communications and Networking Conference, 2009, CCNC 2009, 6$^{th}$ IEEE, Jan. 10, 2009, pp. 1-5.

A. Farhad et al., "Multiple Bitstream Switching for Video Streaming in Monotonically Decreasing Rate Schedulers", Industrial Technology, 2006, ICIT 2006, IEEE International Conference, Dec. 1, 2006, pp. 973-978.

Crabtree, B. et al., "Equitable quality video streaming", BT Group Chief Technology Office, BT, Ipswich, UK, 2009 IEEE Crown (6 pgs.).

Alam, Farhad et al., "Multiple Bitstream Switching for Video Streaming in Monotonically Decreasing Rate Schedulers", Department of Electronics Engineering, Aligarh Muslim University, Aligarh, UP, India and Department of Electronic Systems Engineering, University of Essex, Colchester, UK, 2006 IEEE (6 pgs.).

Nilsson, Mike et al., "Equitable quality video streaming for IP networks", BT Innovate, Ipswich, UK, 2009 Inderscience Enterprises Ltd. (12 pgs.).

Walker, M.D. et al., "Mobile Video-Streaming", BT Technology Journal, vol. 21, No. 3, (Jul. 1, 2003), pp. 192-202.

International Search Report for PCT/GB2011/001296, mailed Oct. 31, 2011.

* cited by examiner

| GoP g | Quality $L_q = 2.7$ | | | | | Quality $L_q = 3.7$ | | | | |
|---|---|---|---|---|---|---|---|---|---|---|
| | Pre-load in milliseconds for rates given by $C_r$ | | | | Rate required with no pre-load, $D_{qg}$ | Pre-load in milliseconds for rates given by $C_r$ | | | | Rate required with no pre-load, $D_{qg}$ |
| | $C_r = 0.6$ | $C_r = 0.8$ | $C_r = 1.0$ | $C_r = 1.2$ | | $C_r = 0.6$ | $C_r = 0.8$ | $C_r = 1.0$ | $C_r = 1.2$ | |
| 1 | 2376376 | 901374 | 12970 | 602 | 374 | 2375295 | 893471 | 10958 | 0 | 773 |
| 2 | 2375612 | 901039 | 12897 | 823 | 377 | 2374633 | 893215 | 10944 | 0 | 780 |
| 3 | 2374772 | 900646 | 12778 | 1010 | 380 | 2373787 | 892821 | 10821 | 0 | 785 |
| 4 | 2373761 | 900126 | 12558 | 1125 | 403 | 2372847 | 892356 | 10641 | 52 | 841 |
| 5 | 2372261 | 899238 | 12043 | 1030 | 381 | 2371447 | 891546 | 10185 | 0 | 787 |
| 6 | 2371211 | 898688 | 11799 | 1127 | 384 | 2370475 | 891056 | 9986 | 0 | 790 |
| 7 | 2370076 | 898074 | 11504 | 1189 | 386 | 2369404 | 890493 | 9727 | 3 | 799 |
| 8 | 2368763 | 897327 | 11101 | 1174 | 387 | 2368198 | 889829 | 9387 | 34 | 808 |
| 9 | 2367443 | 896574 | 10695 | 1156 | 389 | 2366917 | 889108 | 9003 | 34 | 817 |
| 10 | 2366031 | 895752 | 10233 | 1098 | 388 | 2365586 | 888349 | 8588 | 12 | 808 |

Figure 6

VIDEO STREAMING

This application is the U.S. national phase of International Application No. PCT/GB2011/000821 filed 27 May 2011 which designated the U.S. and claims priority to GB 1011047.6 filed 30 Jun. 2010, and EP 10251246.4 filed 12 Jul. 2010, the entire contents of each of which are hereby incorporated by reference.

FIELD OF THE INVENTION

This invention relates to video streaming, in particular where the streaming is over a network with a non-deterministic bandwidth availability. It is particularly, though not exclusively, applicable to the delivery of video that has been encoded at a number of different constant quality levels.

BACKGROUND TO THE INVENTION

Traditionally a video on demand service, such as the applicant's BT Vision service, is supported by encoding video at a constant bit rate and delivering it over a network at the same constant bit rate. This generally requires bandwidth reservation on the network, which can be expensive to provide.

Video encoded using compression techniques naturally has variable bit rate, as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality. When constant bit rate encoding is used, video has to be coded at time varying quality to meet the bit rate constraint. This has been shown to be sub-optimal to the user, who would prefer to see constant quality. Also, by fixing the bit rate independent of the genre of the video content, some genres of content can be encoded well, such as news and drama, whereas others, such as fast moving sport and music videos and concerts, can only be coded quite poorly. Adaptive video delivery using variable bit rate encoding can be used to overcome these problems.

With an adaptive delivery system, the need for bandwidth reservation is removed, with the video delivery system adapting the bit rate of video delivered according to the available network throughput. Content can be encoded at a number bit rates corresponding to a number of quality levels, and delivered over the network without bandwidth reservation. Generally the video data would be delivered as fast as possible; while the quality level (encoded bit rate) is adapted according to the network throughput achieved so as to maximise the quality of the video delivered whilst ensuring that all video data is delivered over the network in time for it to be decoded and displayed without interruption.

International patent application WO 2009/112801 describes a variable bit rate encoding method that maintains a constant perceptual quality. Use is made of a perceptual quality metric (one that achieves a good correlation with actual viewer perception by taking into account masking effects) in a video encoder to encode with constant perceptual quality. Coding parameters, specifically the quantisation parameter, is set separately for each frame taking into account masking effects based on relative contrast levels in each frame. The resulting encoded bitstream has a variable bit rate.

International patent application WO 2005/093995 describes a network with a video server connected to a number of client devices over a shared backhaul. Video content is encoded at a number of constant quality levels and the encoded bitstreams stored on a network based server. In response to requests from the clients, the encoded bitstreams are selected by the server and delivered over the shared network to the clients. Switching between the different bitstreams, and hence qualities, can be done depending on the actual network throughput, with an aim to maximise the quality of the stream.

However, when delivering video content that has been encoded at two or more quality levels, it is necessary to determine the minimum bit rate required to deliver the remainder of the video content at each of the available quality levels, so that a decision can be made as to whether to switch to a different quality bitstream depending on the actual network delivery rate.

One way to determine the minimum delivery bit rate for a given video stream is to analyse the statistics of the encoded video streams prior to commencing delivery. Thus, for a plurality of positions within each video stream, pairs of data can be pre-calculated, each pair containing a delivery bit rate and the minimum start-up delay that would be required if that delivery rate were to be used for timely delivery of the remainder of the given video stream. This data is then used during the subsequent streaming process to determine whether a switch can be made to a different quality stream, based on the amount of data already buffered at the receiver and the actual network delivery rate. Preferably, the quality of the stream selected is as high as the network delivery rate can support.

SUMMARY OF THE INVENTION

It is the aim of embodiments of the present invention to provide an improved method of streaming a video sequence over a network. In particular where the video sequence is encoded at a number of different quality levels, and embodiments of the present invention aim to provide an improved method of determining the particular quality level of video sequence to switch to, whilst ensuring timely delivery of the video sequence.

According to one aspect of the present invention, there is provided a method of transmitting a media stream from a server to a receiver over a transmission link in a network, comprising:
  (a) encoding a media sequence at a plurality of quality levels;
  (b) determining for each encoded media sequence a set of pre-calculated data comprising, for each of a plurality of temporal positions in the sequence, i) for each of a plurality of transmission rates, the minimum preload required at the receiver for timely delivery of the sequence from said temporal position to the end of the sequence, and ii) the transmission rate required for timely delivery of the sequence from said temporal position to the end of the sequence where no preload is present at the receiver, where the preload is the playout duration of the data buffered at the receiver;
  (c) transmitting one of h encoded media sequences to the receiver; and during transmission,
  (d) determining the current preload at the receiver, and for a media sequence encoded at one of the plurality of quality levels;
    selecting from the set of pre-calculated data associated with the respective quality level a first preload above and a second preload below the current preload, and the respective first and second transmission rates;
    calculating an intersection time as the time when the total number of bits delivered by the first and second transmission rates are equal when taking into account the respective first and second preloads;

calculating the number of bits delivered by the intersection time;

calculating an acceptable delivery rate required for timely delivery of the sequence as the number of bits delivered by the intersection time divided by the sum of the current preload and intersection time; and after an elapsed time following step (d)

(e) calculating a sufficient delivery rate required as equal to the difference between the number of bits delivered by the intersection time and the actual number of bits delivered during the elapsed time divided by the sum of the current preload and intersection time minus the elapsed time; and calculating a new acceptable delivery rate by repeating step (d); and (f) determining the minimum required delivery rate to ensure timely delivery of the remainder of the sequence as the minimum of the new acceptable delivery rate and the sufficient delivery rate.

Preferably, the media stream is a video stream. The quality levels may be fixed for e each encoded sequence. The quality levels may be perceptual quality levels.

The receiver preferably performs steps (d) to (f).

The calculating of the intersection time may be determined as the difference between the product of the second preload and second transmission rate and the product of the first preload and the first transmission rate, wherein said first intersection time is equal to the difference between the products divided by the difference between the first and the second transmission rates.

The calculating of the number of bits delivered by the intersection time may be determined as the product of the second transmission rate and the sum of the second preload and the intersection time, or the product of the first transmission rate and the sum of the first preload and the intersection time The method may further comprise (g) determining the actual transmission rate of the sequence over the transmission link, and deciding whether to switch to a sequence encoded at a different quality level based on the minimum required delivery rate compared to the actual transmission rate.

The temporal position is a position of a group of pictures in an encoded video stream.

According to a further aspect of the present invention, here is provided a method of handling a media stream at a receiver, comprising:

(a) receiving a set of pre-calculated data for a media sequence encoded at a plurality of quality levels, said set comprising, for each of a plurality of temporal positions in the sequence, i) for each of a plurality of transmission rates, the minimum preload required at the receiver for timely delivery of the sequence from said temporal position to the end of the sequence, and the transmission rate required for timely delivery of the sequence from said temporal position to the end of the sequence where no preload is present at the receiver, where the preload is the playout duration of the data buffered at the receiver;

(b) receiving an encoded media sequence; and during reception, (c) determining the current preload at the receiver, and for a media sequence encoded at one of the plurality of quality levels;

selecting from the set of pre-calculated data associated with the respective quality level a first preload above and a second preload below the current preload, and the respective first and second transmission rates;

calculating an intersection time as the time when the total number of bits delivered by the first and second transmission rates are equal when taking into account the respective first and second preloads;

calculating the number of bits delivered by the intersection time; calculating an acceptable delivery rate required for timely delivery of the sequence as the number of bits delivered by the intersection time divided by the sum of the current preload and intersection time; and after an elapsed time following step (c)

(d) calculating a sufficient delivery rate required as equal to the difference between the number of bits delivered by the intersection time and the actual number of bits delivered during the elapsed time divided by the sum of the current preload and intersection time minus the elapsed time; and calculating a new acceptable delivery rate by repeating step (c); and (e) determining the minimum required delivery rate to ensure timely delivery of the remainder of the sequence as the minimum of the new acceptable delivery rate and the sufficient delivery rate.

BRIEF DESCRIPTION OF THE DRAWINGS

For a better understanding of the present invention reference will now be made by way of example only to the accompanying drawings, in which:

FIG. 6 is table showing examples of pre-calculated data associated with a bitstream;

DESCRIPTION OF PREFERRED EMBODIMENTS

The present invention is described herein with reference to particular examples. The invention is not, however, limited to such examples.

The network contains one or more network based video servers connected to one or more video receivers over a shared network. Multiple pieces of video content are each encoded at a number of constant quality levels and stored on one or more of the network based servers. In response to requests from a receiver, video content is selected on a server and delivered over the shared network to the receiver. The system selects the quality level of the stream to deliver based on characteristics of the video stream currently being delivered, and the number of bits already buffered at the video receiver and the available network throughput. The aim is to select the video quality being delivered according to the available network throughput so as maximise the quality while ensuring that all video data is delivered over the network in time for it to be decoded and displayed without interruption.

Figure 1:
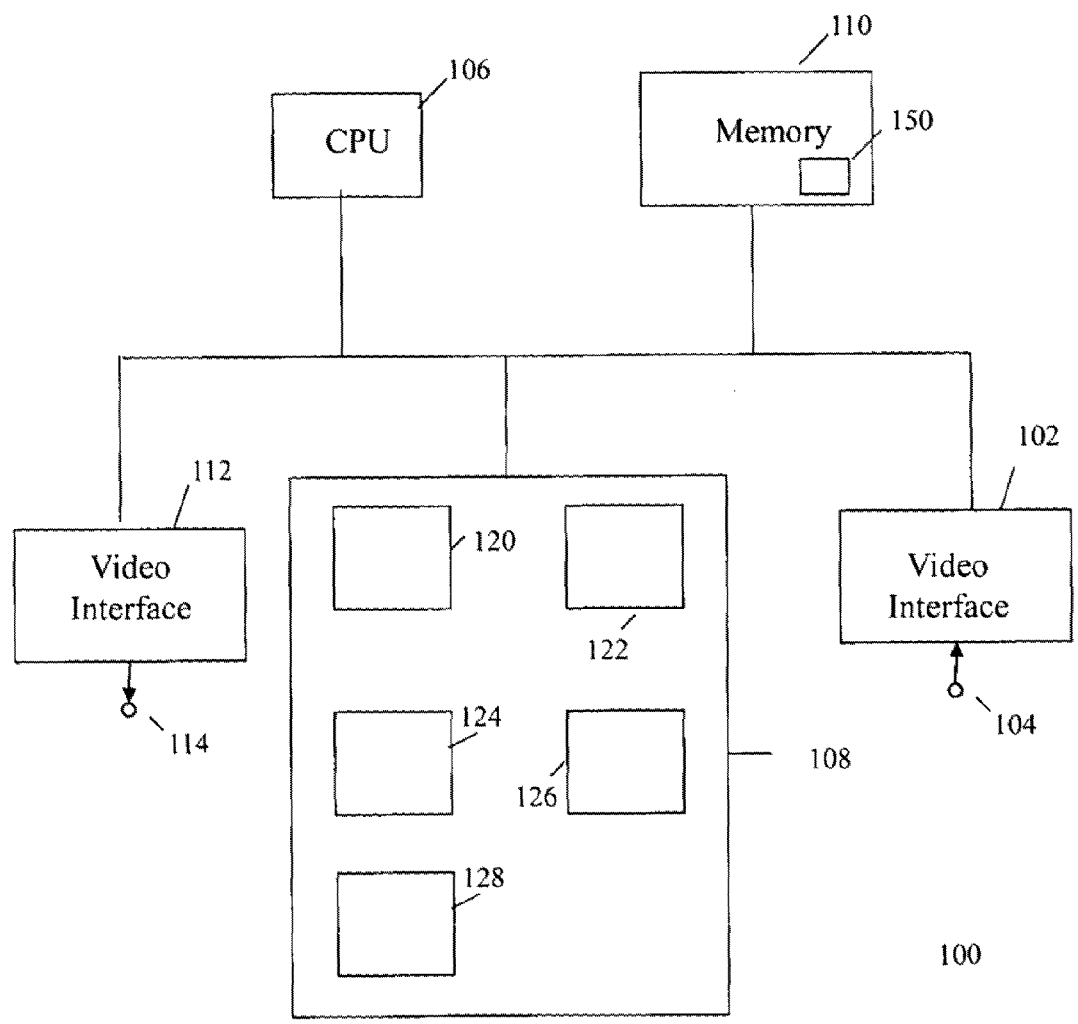
FIG. 1 is shows a video server capable of adaptive video delivery.

The server 100 shown in FIG. 1 comprises a video input interface 102 that receives digitally coded video signals 104, in uncompressed form. A processor 106 operates under control of program modules stored in local storage 108, for example a hard disk, and has access to memory 110 and a video output interface 112 for connection, via a telecommunications network to plural client devices. The video output interface 112 may include a buffer to temporarily store video encoded by the processor 106 before outputting the encoded bit stream 114. The memory includes a memory area 150 for storage of the encoded video and parameters associated with the encoded video.

The program modules include a general purpose operating system 120 and various video coding software modules which implement one of more of the video coding methods shortly to be described. The software modules comprise several program types, namely:
- a control module 122;
- a compression module 124: in this example the compression software implements a coding algorithm compliant with the ITU H.264 standard;
- a perceptual quality evaluation module 126;
- a bitstream evaluation module 128;

It is understood that plural video streams can be received, encoded and stored in storage 110, for later streaming via the output interface 112.

Figure 2:
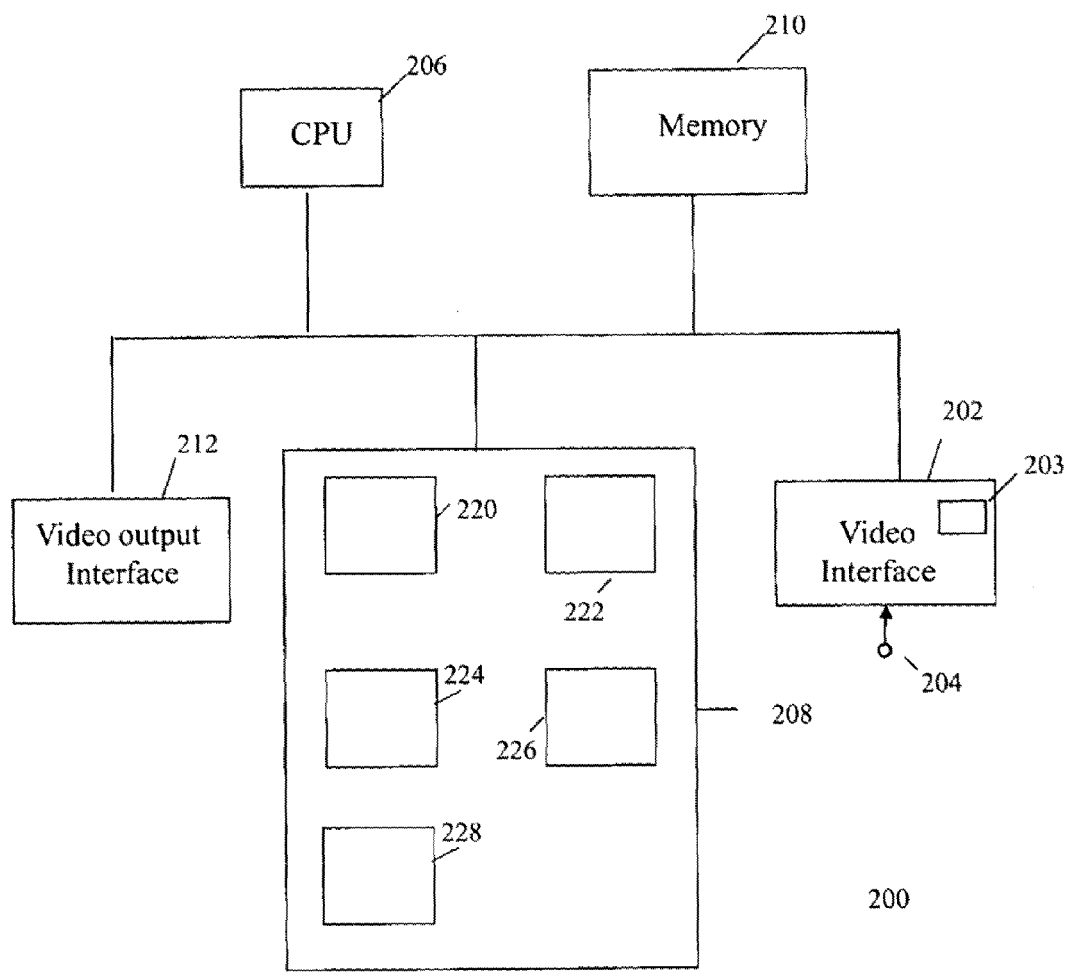
FIG. 2 is shows a receiver capable of receiving adaptive video.

The server 100 transmits encoded video to a receiver, which includes a video decoder. FIG. 2 illustrates an example receiver 200. The receiver 200 is connected to the video server 100 over a suitable network and is capable of receiving and decoding encoded video streams transmitted by the server 100.

Specifically, the receiver 200 comprises a video input interface 202 that receives encoded video signals 204, such as encoded bitstreams transmitted by the server 100. A processor 206 operates under control of program modules stored in local storage 208, for example a hard disk, and has access to memory 210 and a video output interface 212 for connection to a suitable output device such as a monitor or television. The video input interface 202 includes a buffer 203 to temporarily store received encoded video until the encoded video is ready for decoding by the processor 206.

The program modules include a general purpose operating system 220 and various video decoding software modules which implement a decoding method for decoding the received encoded video bitstreams. The software modules comprise several program types, namely:
- a control module 222;
- a decoding module 224: in this example the decoding software implements a decoding algorithm compliant with the ITU H.264 standard;
- an interpolation module 226;
- a bitstream switching module 228;

A video sequence that has been encoded at variable bit rate can be delivered over a network at piecewise constant bit rate, with the rate of each piece decreasing monotonically. This is believed to have first been noted by Professor Mohammed Ghanbari. He referred to the resulting bit rate profile as a "downstairs" function.

The applicant's international patent application WO2004/047455 describes one method of analysing a video sequence that has been encoded at variable bit rate to determine a video delivery schedule for that sequence consisting of one or more contiguous periods of constant bit rate delivery in which the rates are monotonically decreasing.

Figure 3:
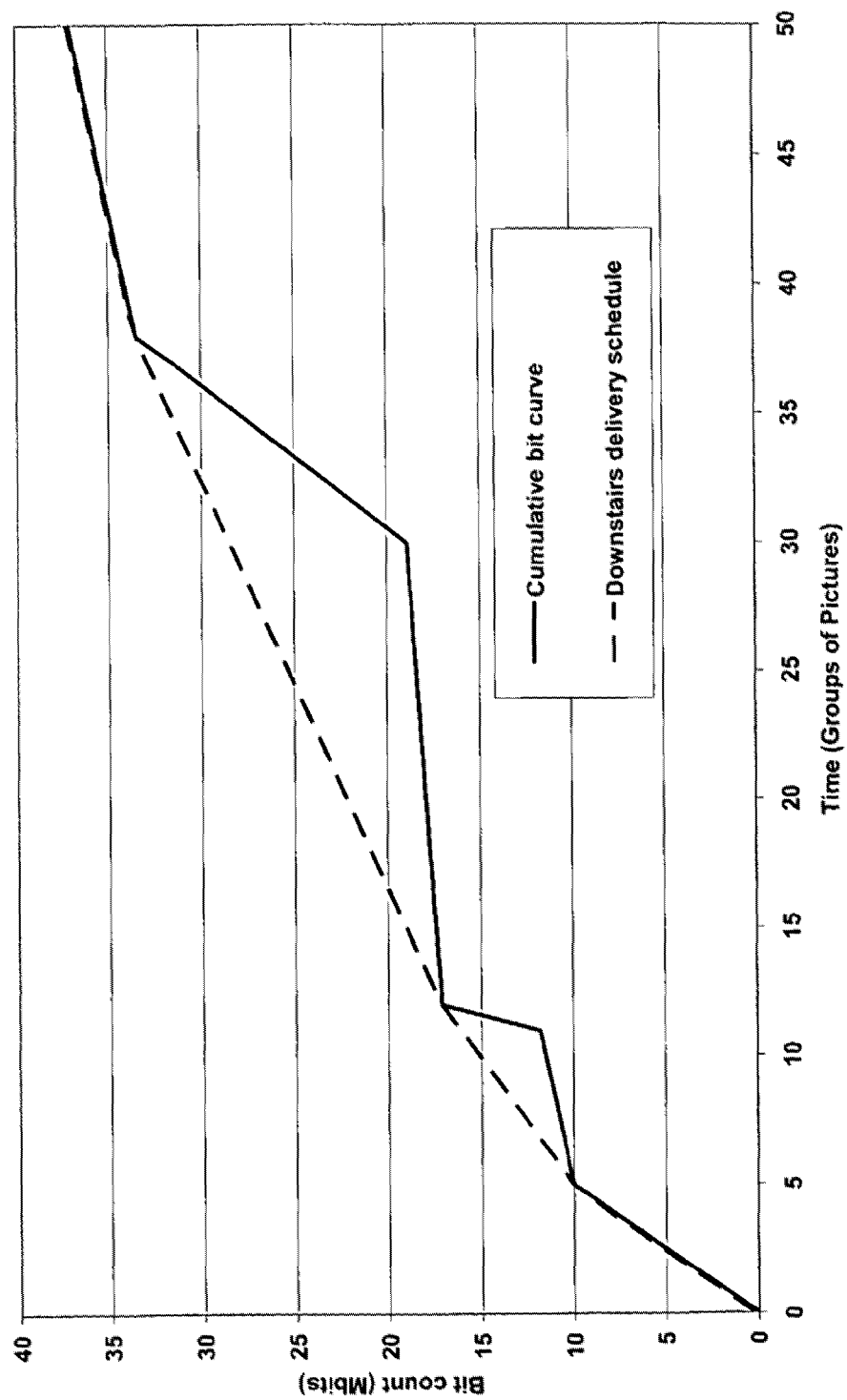
FIG. 3 is a graph showing a cumulative bit curve for a video sequence encoded at variable bit rate and its piecewise constant, monotonic decreasing, delivery schedule, referred to as the "downstairs delivery schedule"

In an alternative visualisation the cumulative number of bits in the encoded video sequence is plotted against time. An example of such a cumulative bit curve is shown in FIG. 3. FIG. 3 shows the cumulative bit curve, which is a plot of the total number of bits in the encoded video sequence to date against time. The "downstairs" delivery rate required for initial delivery of this stream is the slope of the line of lowest slope that passes through the origin and is never to the right of the cumulative bit curve, that is, ensuring all bits are delivered before they are needed for decoding. Such a delivery line (or delivery schedule) will touch the cumulative bit curve in one or more places, but typically only once. When delivery to that point (or the last of those points) in the video sequence has occurred, all video bits delivered will be decoded and no bits will be buffered awaiting subsequent decoding. From this point onwards, a new line of lowest slope could be calculated, and the next coded video bits delivered at this lower rate.

Video that is encoded at constant bit rate will have a cumulative bit curve near to a straight line. Video that is not coded at constant bit rate, for example, video coded with constant quantisation index or with constant perceptual quality will have a cumulative bit curve that in general will not be a straight line. Such video could be transmitted over a network with a delivery schedule similar to the cumulative bit curve, and thus require little buffering in the receiver, or, with unlimited buffering available in the receiver, could be delivered with any delivery schedule subject to every bit being received before it is needed for decoding. When plotted on a graph, with time along the horizontal axis and cumulative bits on the vertical axis, this requirement can be expressed as the delivery schedule must never be to the right of the cumulative bit curve. When there is unlimited buffering at the receiver, it is always possible to deliver any bitstream using constant bit rate delivery at any constant rate: it is just necessary to ensure decoding is delayed sufficiently to keep the delivery schedule to the left of the cumulative bit curve. In the extreme case, the whole of the video sequence could be delivered very slowly and decoding started only as the delivery is about to finish.

In the examples considered here, we consider discrete "chunks" each comprising one or more frames. The choice of chunks is subject to the consideration that, in order to keep to a minimum any interdependence of quality between chunks, a chunk can be one or more frames coded independently of any other chunk, typically starting with an I-frame (one coded without prediction from any other frame). In all the examples here, the chunk chosen was a group of pictures (GOP) of IBBP format and all the plots shown are of cumulative bits per group of pictures, Σb, where b is the number of bits in a group of pictures, plotted against group of pictures index.

In the streaming system envisioned, each video sequence is encoded multiple times by the video server 100, each time with a different level of perceptual quality. Encoding at fixed levels of perceptual quality is preferably performed as described in the applicant's International application WO2009/112801. However, other methods of encoding could be used, such as encoding with a constant quantisation index.

We assume the receiver has sufficient buffering to be able to store a whole video stream. This allows the timing of delivery of the video data to be decoupled from the decoding of it, provided we ensure data is delivered before it is needed for decoding.

The delivery bit rate required to deliver a video stream in timely fashion depends on how much data is already buffered at the receiver, and the bit rate profile of the bits yet to be decoded. By analyzing the encoded video stream at the video server 100 prior to delivery, and by monitoring the amount of data buffered at the receiver 200 following delivery by the server 100, we can determine, for each possible quality level that could be delivered, the minimum bit rate required for timely delivery.

Figure 4:
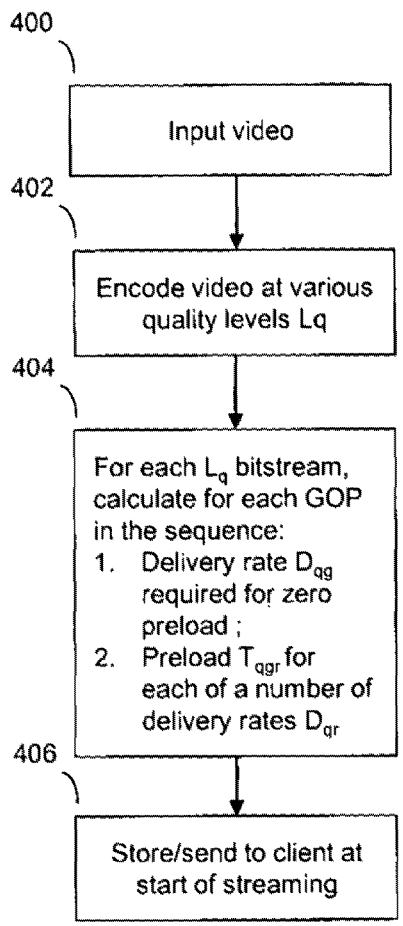
FIG. 4 is a flow chart showing the encoding of video content at various quality levels and the pre-calculation of parameters associated with each of those bitstreams.

The encoding and pre-calculations performed by the video server 100 are summarised in the flow chart of FIG. 4. In step 400 of FIG. 4, the server 100 receives a video sequence. In step 402, the compression module 124 in the server 100 encodes the video sequence at a number of fixed quality levels $L_q$ (where q=1 ... Q). The amount of data (bits) $b_{qg}$ generated for each group of pictures g (where g=1 ... G) is also determined, by the bitstream evaluation module, and stored in memory 150 together with each of the encoded bitstreams. The quality level may for example be set by selecting a suitable quantisation parameter for the encoding process.

In step 404, each of the encoded bitstreams are analysed by the bitstream evaluation module 128 to create a file of pre-calculated data giving the following information for each quality at which the content was encoded for each group of pictures.

1) Firstly we calculate the minimum delivery rate $D_{qg}$ that would be needed for delivery (transmission) of that group of pictures and all subsequent groups of pictures without decoder buffer underflow occurring at the receiver 200 if no video is initially buffered at the decoder. This rate can be referred to as the zero start-up delay delivery rate, or zero preload delivery rate, for the given group of pictures. The term "preload" and start-up delay will be used interchangeably to refer to the duration of the video buffered at the receiver ready for playback.

So, we calculate the delivery rate $a_{qgk}$ that would be needed to deliver quality q, from group of pictures g to group of pictures k using the earlier calculated amount of bits, $b_{qg}$:

$$a_{qgk} = \left\{ \frac{1}{k-g+1} \sum_{j=g}^{k} b_{qj} \right\} \quad [1]$$

The minimum delivery rate $D_{qg}$ can then be calculated as the maximum value of $a_{qgk}$ for all k satisfying g≤k≤G:

$$D_{qg} = \text{Max}_{k=g}^{G} \left\{ \frac{\sum_{j=g}^{k} b_{qj}}{k-g+1} \right\} \quad [2]$$

This minimum delivery rate $D_{qg}$ is calculated for each group of pictures g in the sequence, and for all sequences encoded at each of the qualities $L_q$.

2) Secondly we calculate the minimum amount of time, or preload, $T_{qgr}$ that must be buffered at the receiver for delivery (transmission) of that group of pictures and all subsequent groups of pictures without decoder buffer underflow occurring at each of a set of delivery rates $D_{qr}$ (r=1 ... $r_{max}$) where the delivery rates are measured in units of bits per group of pictures period. For convenience, and so that each sequence will have the same range of relative delivery rates, the rates $D_{qr}$ may defined as fixed multiples, $C_r$, of the average coded bit rate at that quality:

$$D_{qr} = \left\{ \frac{C_r}{G} \sum_{j=1}^{G} b_{qj} \right\} \quad [3]$$

Figure 5:
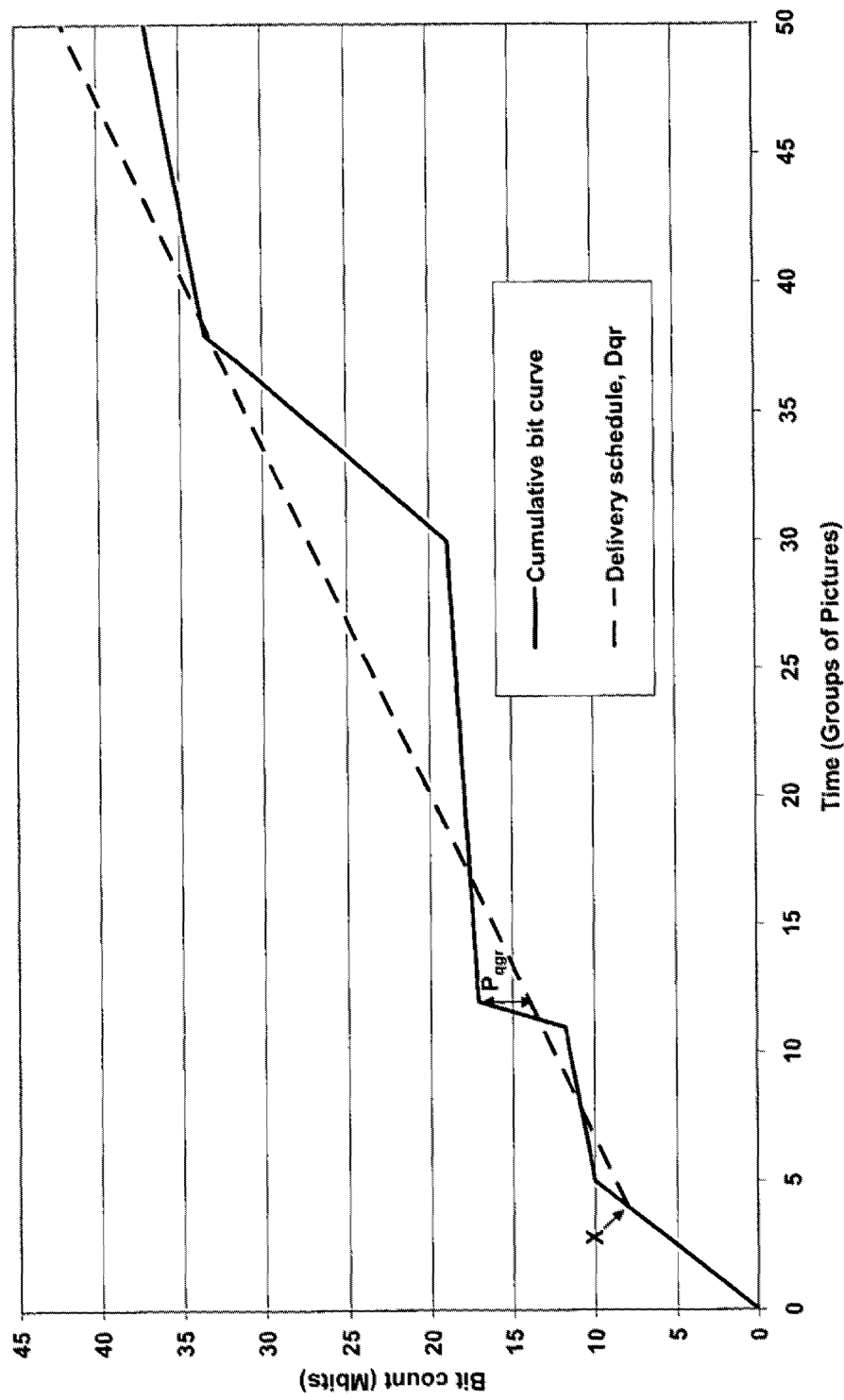
FIG. 5 is a graph showing how he preload time can be calculated for a given delivery rate.

This time $T_{qgr}$ may be visualised as being obtained by drawing, on FIG. 5, a line of slope $D_{qr}$ having origin, X, on the cumulative bit curve at group of pictures g−1. For each subsequent group of pictures, the vertical distance between the line and the cumulative bit curve is measured, and the largest distance, $P_{qgr}$, of the line below the cumulative bit curve is determined. This represents the required preload of bits for delivery at rate $D_{qr}$ starting with delivery of the group of pictures with index g. This largest distance, $P_{qgr}$, is divided by the slope $D_{qr}$ to obtain the preload $T_{qgr}$.

Thus $$P_{qgr} = \text{Max}_{k=g}^{G} \left\{ \sum_{j=g}^{k} (b_{qj} - D_{qr}) \right\} \quad [4]$$

and $$T_{qgr} = \frac{P_{qgr}}{D_{qr}} \quad [5]$$

Note, if the line in FIG. 5 is always above the cumulative bit curve and all distances are negative, then the required preload is zero.

Thus, Equation 5 can be rewritten as:

$$T_{qgr} = \text{Max}\left\{ 0, \frac{P_{qgr}}{D_{qr}} \right\} \quad [6]$$

In step 406 of FIG. 4, these pre-calculated parameters from step 404 can be stored as a suitable file in memory 150. Thus, we will effectively have a table of data for each encoded video stream (at each quality $L_q$), with the following data per GOP g—the delivery rate required for zero start-up delay, and the pre-load required for each of a number of delivery rates (based on fixed multiples $C_r$ of the average bit rate of the entire stream).

FIG. 6 shows an example of a table of pre-calculated data with a video sequence of 10 GOPs, and encoded at two different quality levels $L_q=2.7$ and 3.7. Rate multiples $C_r=0.6$, 0.8, 1.0 and 1.2 are used in this example.

The pre-calculated data can be used to determine the rate required for each quality stream to be transmitted given the amount of preload at the receiver. For example, if the amount of preload at the receiver is measured to be 10 seconds, or 10000 ms, and the next GOP to be delivered is g=6, then we can see from FIG. 6 that the rate required for delivery at $L_q=2.7$ is between $C_r=1.0$ and 1.2. Similarly, for $L_q=3.7$, the rate required is between $C_r=0.8$ and 1.0. Thus, an actual streaming rate of $(C_r=)1.2$ times the mean bit rate for $L_q=2.7$ would be sufficient to support the $L_q=2.7$ stream.

However, an actual streaming rate of $(C_r=)1.0$ times the mean bit rate for $L_q=2.7$ would not be sufficient to support the $L_q=2.7$ stream. Similarly, an actual streaming rate of $(C_r=)1.0$ times the mean bit rate for $L_q=3.7$ would be sufficient to support the $L_q=3.7$ stream, However, an actual streaming rate of $(C_r=)0.8$ times the mean bit rate for $L_q=3.7$ would not be sufficient to support the $L_q=3.7$ stream.

The amount of data that can realistically be pre-calculated is limited, and so it is not possible to have pre-calculated data for all possible values of preload. Thus, in order to determine more accurately the streaming rate required to support a given quality level of video when a certain preload is present at the receiver, an interpolation method is proposed as described below.

Figure 7:
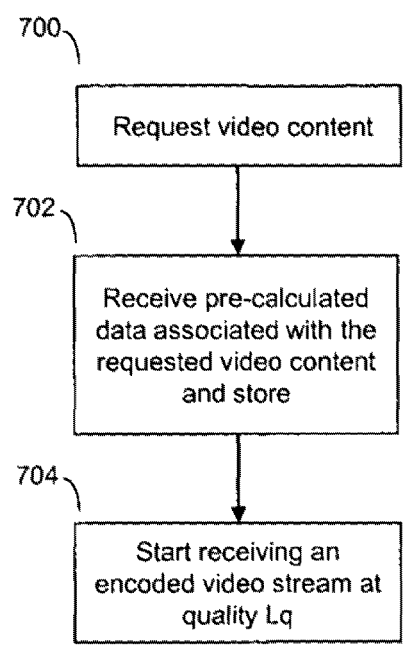
FIG. 7 is a flow chart showing how a receiver can request and receive a video stream, including the pre-calculated data.

Now, once the server has, finished pre-calculating the data as described, the server 100 can start sending the encoded video to the receiver 200. FIG. 7 shows the processes at the receiver 200 when requesting video content from the server 100. Starting at step 700, the receiver 200 makes a request to the server 100 for some video content. The server 100 sends to the receiver 200 the pre-calculated data associated with the requested video, which is received by the receiver 200 in step 702. The receiver 200 stores this pre-calculated data in memory 210. The server 100 then starts streaming the requested video by selecting a suitable quality $L_q$ bitstream to transmit to the receiver 200. Thus, in step 704, the receiver 200 starts receiving the video stream encoded at quality $L_q$.

The selection of the initial quality of the bitstream to be transmitted to the receiver 200 may be done according to any suitable method by the server 100 or can be determined by the receiver 200, such as starting with the lowest quality available, or selecting the quality that is most appropriate for the available network bandwidth at that time.

Figure 8:
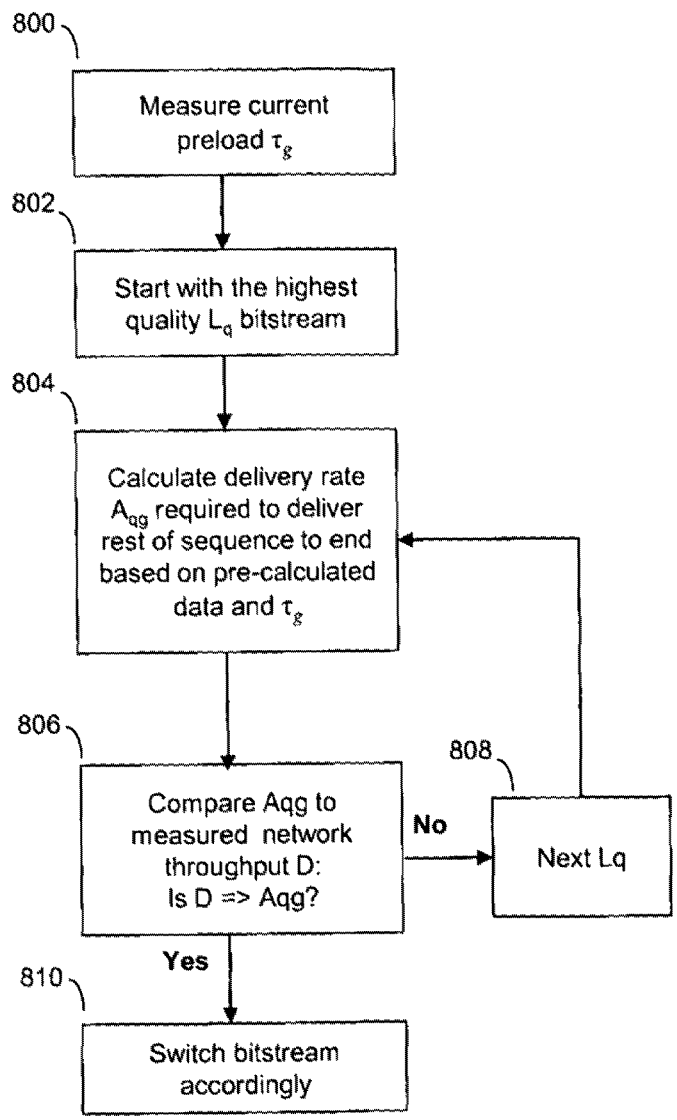
FIG. 8 is a flow chart showing how the receiver can use the pre-calculated data to determine the minimum delivery rate required to stream each quality of video.

Once the receiver 200 has started to receive the encoded video stream, the receiver can perform the steps shown in FIG. 8 using the stored pre-calculated data.

In step 800 of FIG. 8, the next group of pictures to be delivered is that with index g. The receiver calculates how much data $\tau_g$ is buffered in the receiver's buffer 203, in terms of time. $\tau_g$ is the preload or put another way, the start-up delay for the next data to be delivered. This (assuming that the units of time are group of pictures periods) is simply a count of h number of groups of pictures received minus the duration of video played out.

Then for each video quality level $L_q$, starting at the highest quality in step 802 and working downwards, calculate using the interpolation module 226 in step 804 a delivery rate $A_{qg}$ that would be sufficient to deliver the group of pictures with index g and all subsequent groups of pictures at this quality without decoder buffer underflow occurring using an interpolation method and based on the pre-calculated data stored at the receiver, as follows.

We need to know he delivery rate required given the amount of data already buffered at the receiver, which if measured in terms of the play-out time it represents, corresponds to the preload or start-up delay for the next data to be delivered. As it is not feasible to generate pre-calculated data for all possible values of start-up delay, we can estimate the delivery rate required by interpolation using the information that we have pre-calculated.

Figure 9:
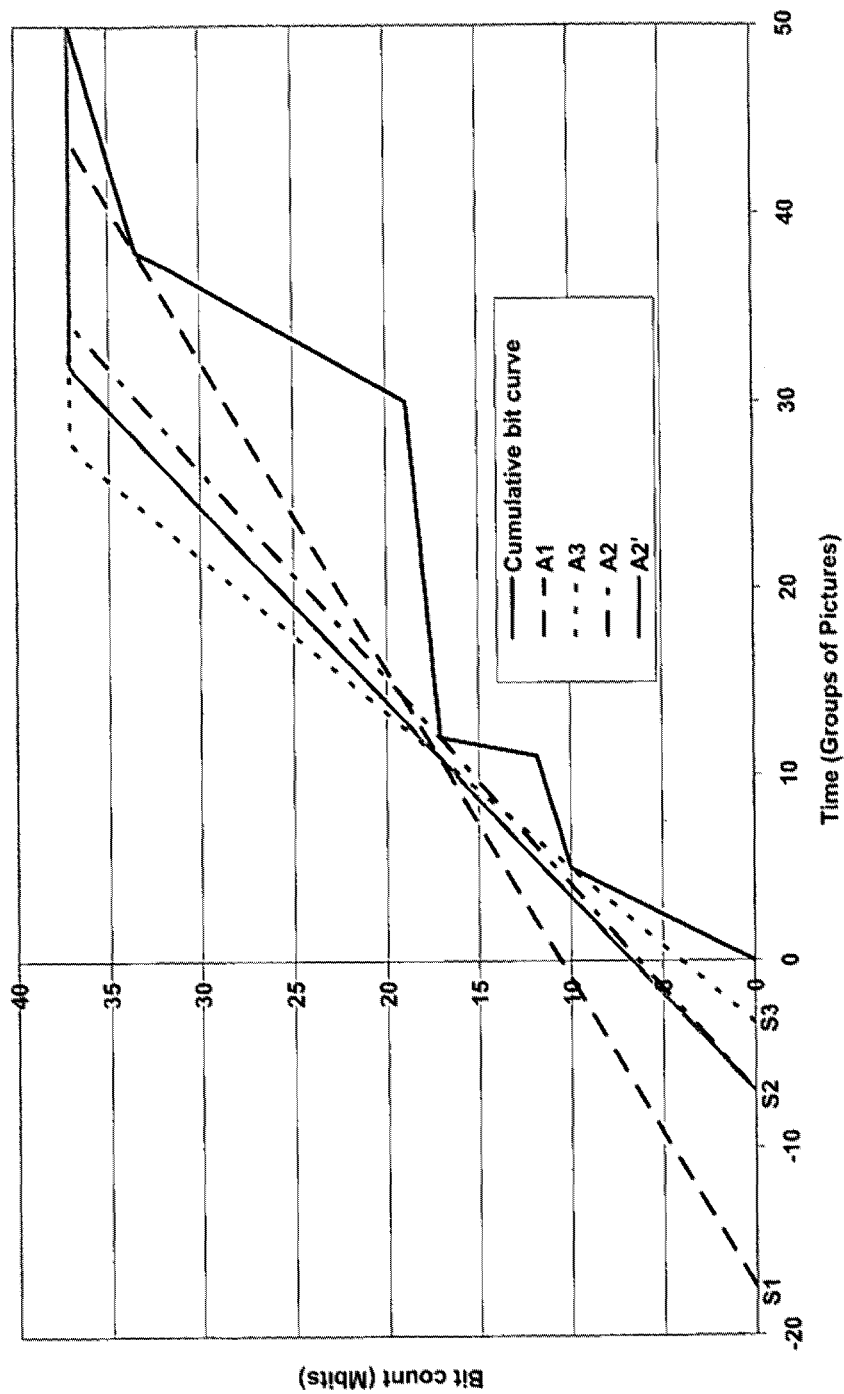
FIG. 9 is a graph showing the delivery rate required when a given amount of data is already buffered at the client can be estimated from two sets of pre-calculated data associated with a smaller and larger delivery rate.

FIG. 9 shows how the delivery rate required when a given amount of data is already buffered at the client can be safely estimated from two sets of pre-calculated data, one giving the amount of preload required for a smaller delivery rate and the other giving the amount of preload required for a larger delivery rate.

FIG. 9 shows the cumulative bit curve and delivery schedules for three delivery bit rates, A1, A2 and A3. The minimum amounts of preload required, expressed as start-up delays for the next data to be delivered, S1 and S3, for the delivery rates A1 and A3 respectively, have been pre-calculated. The optimum rate for the actual start-up delay S2 present at the receiver (measured as $\tau_g$), where S2 is between S1 and S3, would be A2 and would give the dot-dash line shown. However, we do not have any pre-calculated data for preload S2 and thus the required delivery rate A2. The problem then is to provide a safe estimated value A2' for the delivery rate A2 required for start-up delay S2, i.e. A2'≥A2. The solution is to select pre-calculated data that we do have, specifically a preload S1 that is greater than S2, and preload S3 that is less than S2 and their respective delivery rates A1 and A3, and apply the interpolation method set out below.

To ensure timely delivery of bits, the delivery schedule A2' must be on or to the left of the cumulative bit curve. This is ensured if the delivery schedule A2' passes through the intersection of the delivery schedules, A1 and A3, which occurs at time T. The intersection of the delivery schedules A1 and A3 occurs when the total bits B delivered by each delivery schedule are equal (taking into account the respective preloads). Thus, we can say:

$$A1 \cdot (T+S1) = A3 \cdot (T+S3) \quad [7]$$

Equation 7 can be rewritten as Equation 8 below to give the intersection time T.

$$T = \frac{S3 \cdot A3 - S1 \cdot A1}{A1 - A3} \quad [8]$$

An acceptable delivery rate for start-up delay S2 is the straight line of slope A2' passing through this point, given by Equation 9 below. As shown in FIG. 9, this may not optimal.

$$A2' = \frac{(S1+T) \cdot A1}{S2+T} \quad [9]$$

Thus, Equation 9 gives a safe estimate of the minimum delivery rate $A_{qg}$, that is, the rate is sufficient deliver the group of pictures with index g and all subsequent groups of pictures without decoder buffer underflow at the receiver 200, but may be more than is absolutely necessary.

Referring to the example described above in relation to FIG. 6 where the next GOP g=6, and the measured preload is 10000 ms. Let's assume the average bit rate for $L_q=2.7$ is 262 kbit/s. For $L_q=2.7$ stream, set S1=11799 ms, S3=1127 ms, A1=262 (1.0×262), and A3=314.4 (1.2×262). Thus, applying equation 8, we get T=52233. Now, using equation 9, this calculated value of T and S2=10000 ms, we get A2'=269.6 kbit/s. Thus, the minimum delivery rate $A_{qg}$=269.6 kbit/s. If the network throughput is at least 269.6 k/bit/s, then the $L_q$=2.7 stream can be supported from GOP g=6 onwards.

In step 806, $A_{qg}$ can be compared to the actual network throughput D to determine if the required minimum rate is met. If the D is at least equal to $A_{qg}$, then stream of quality $L_q$ under consideration can be streamed by the network. Thus, in step 810, a decision can be made to switch to, or remain on, this $L_q$ quality level stream. The decision as to exactly when to switch may be based on other factors, such as tolerances and thresholds relative to the calculated minimum $A_{qg}$. If D is not at least $A_{qg}$, then processing passes to step 808, where the pre-calculated data for the next lowest $L_q$ stream can be analysed, and steps 804 onwards repeated to determine the minimum delivery rate $A_{qg}$ required for the this next stream $L_q$.

Steps 804 and 806 can be repeated for all quality levels if required to get picture of the rates required for each quality level of stream.

It can be seen from FIG. 9 that when the intersection of he delivery schedules A1 and A3 is on the cumulative bit curve, the interpolation method will give the exact required rate, and otherwise will provide an over estimate of the required rate.

Now consider repeating the calculation of required delivery rate after the delivery of the group of pictures with index g and zero or more subsequent groups of pictures. If the delivery rate achieved is exactly $A_{qg}$, then the delivery schedule follows the line A2', and each time the interpolation is repeated, the same intercept time T will be calculated, and the same required delivery rate $A_{qg}$ will be calculated. If the delivery rate achieved is different from $A_{qg}$, then the delivery schedule will diverge from the line A2'. But during the period that the delivery schedule remains between the lines A1 and A3, it can be seen from FIG. 9 that each time the interpolation is repeated, the same intercept time T will be calculated, and a different, but consistent, required delivery rate $A_{qg}$ will be calculated.

Figure 10:
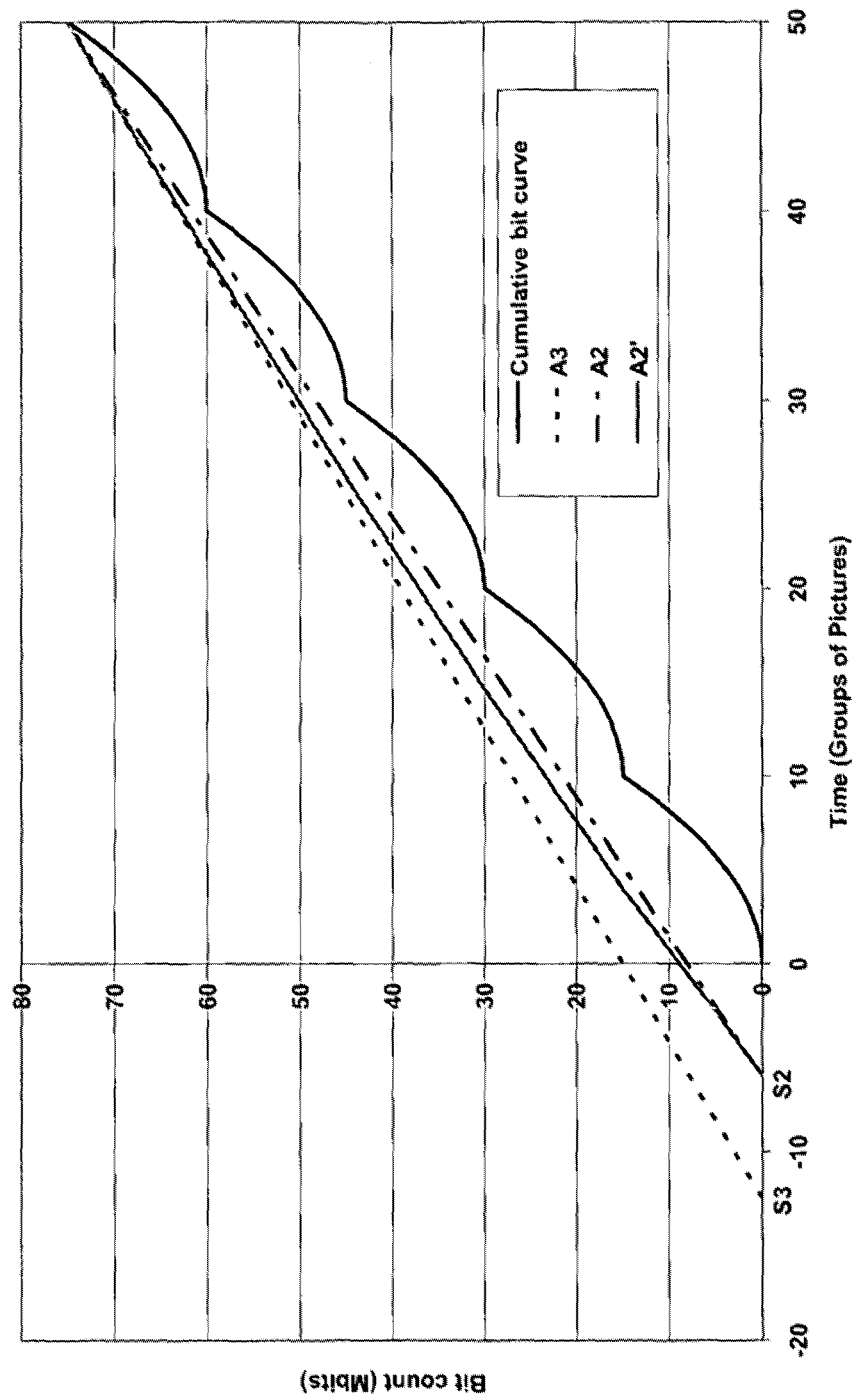
FIG. 10 is a graph showing a delivery schedule where the delivery rate is calculated by interpolation using pre-calculated data, and where delivery is at the calculated rate, and where a new rate is calculated after delivering each group of pictures.
Figure 11:
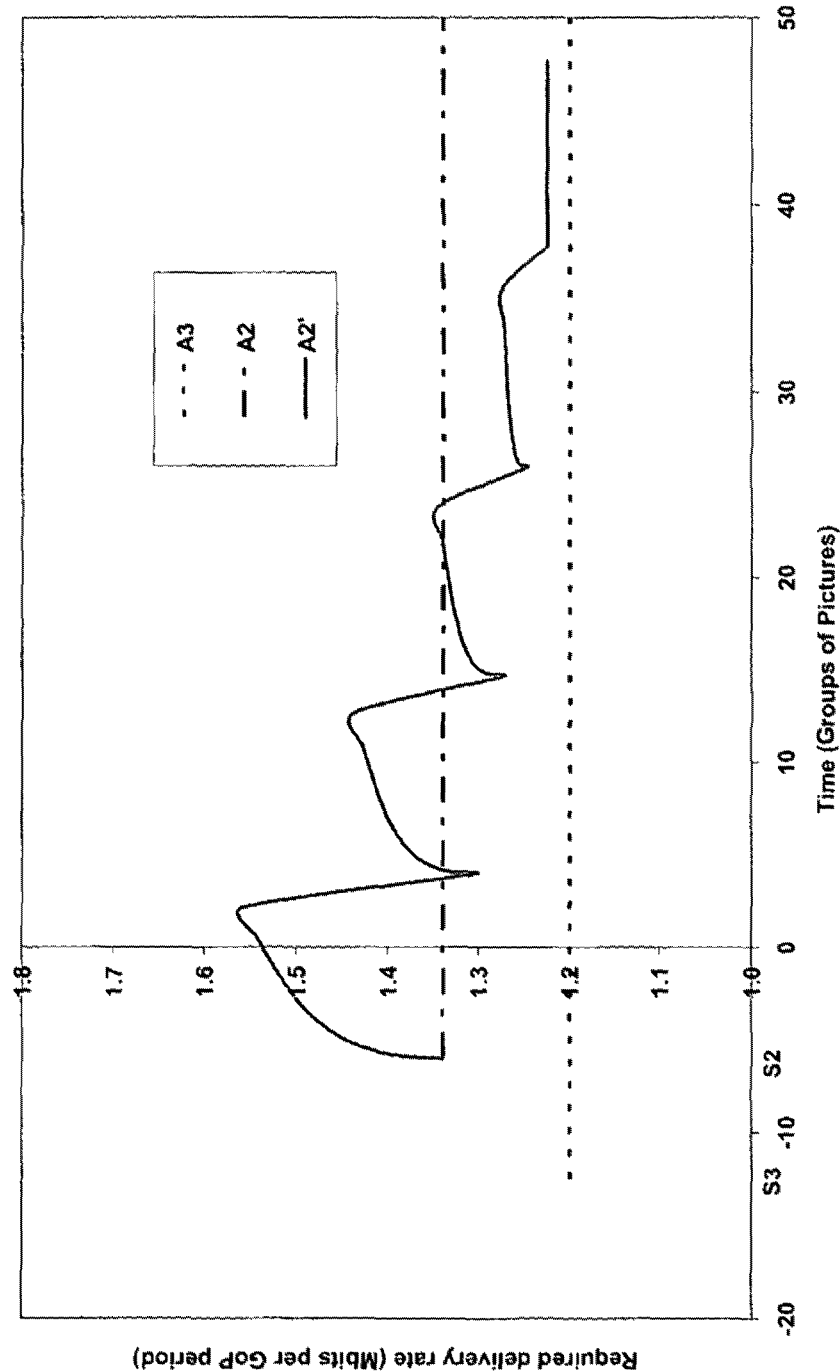
FIG. 11 a graph showing how the calculated required delivery rate of FIG. 8 varies with time.

Now consider the case where A3 is the highest delivery rate for which pre-calculations have been performed, and where the current delivery point is to the right of the line A3, and to the left of the cumulative bit curve, as otherwise it would represent an invalid delivery point as the bits would not have been delivered in time for decoding. In this case interpolation is performed using the rate A3 and the associated pre-calculated start up delay, S3, as one set of data, and the pre-calculated zero start-up delay delivery rate as the other. FIG. 10 shows such a delivery schedule where delivery is at the calculated rate, and a new rate is calculated after delivering each group of pictures. FIG. 11 shows how this calculated delivery rate varies with time.

FIG. 11 shows that even when delivery is at the rate calculated by interpolation, which is known to produce a rate greater than or equal to that actually needed, the rate when calculated again after delivering a group of pictures may be higher. And when this higher rate is used to deliver the next group of pictures, the next calculated rate may be higher still. This behaviour of calculating ever increasing rates does not continue indefinitely, but stops when the pre-calculated rate for delivering with zero start up delay decreases from its previous value. This happens at the cusps of the cumulative bit curve of FIG. 10. When the first such point is reached, the newly calculated rate is actually lower than the first calculated value, as shown in FIG. 11, as the average delivery rate to this time has been higher than needed, and hence a lower rate from this time is possible. But as more groups of pictures are delivered, the calculated delivery rates increase again due to the increasing rates pre-calculated for delivering with zero start up delay.

This is a problem with the combination of interpolation with the pre-calculation of the required start up delays for a finite number of delivery rates. Although the use of pre-calculated delivery rates for delivering with zero start up delay is useful in that it allows a delivery rate to be calculated for low values of start up delay, the fact that this rate can change rapidly from one group of pictures to another leads to this problem of rapidly varying calculated delivery rates, when there is actually no change in the underlying required rate. In a real video delivery system, such variation in the calculated delivery rate may lead to unnecessary switching between video streams encoded at different qualities. This would cause unnecessary changes in video quality to the viewer, and unnecessary effort in the video delivery system to perform such switches. We can overcome this problem by adapting our interpolation method in the following way.

When performing the interpolation calculation using the pre-calculated data with the highest bit rate and the pre-calculated rate required for zero start up delay using Equations 8 and 9, the number of bits, B, that would be delivered at the interception point T, is also calculated as in Equation 10 as follows:

$$B=(S3+T)\cdot A3=(S1+T)\cdot A1 \quad [10]$$

As the next and subsequent groups of pictures are delivered, the number of subsequent bits delivered, b, are counted, and the elapsed time, t, is measured. The ratio between these is calculated, to give an actual delivery rate achieved, r. When this value is greater than or equal to the previously calculated interpolated required delivery rate, A2', we can calculate a sufficient delivery rate, a, as the rate required to reach the previously calculated interception point (T, B) from the current delivery point (t, b), as in Equation 10.

$$a = \frac{(B-b)}{(S2+T-t)} \quad [11]$$

This calculation can be applied repeatedly until the quantity B bits have been delivered since B was calculated, and while r is calculated to be greater than or equal to the interpolated required delivery rate, A2'. In addition, after delivering each group of pictures, the interpolation calculation using the pre-calculated data with the highest bit rate and the pre-calculated rate required for zero start up delay can be performed to give a new interpolated required delivery rate, A2', and the lower, A2'', of the two calculated required delivery rates used:

$$A2''=\min(a, A2') \quad [12]$$

Use of equations 10, 11 and 12 are included as part of step 804 in this improved interpolation method to determine A2'', which is a more accurate measure of the minimum required delivery rate $A_{qg}$. This improved method is also set out in FIG. 12, which effectively expands upon step 804 in FIG. 8.

Figure 12:
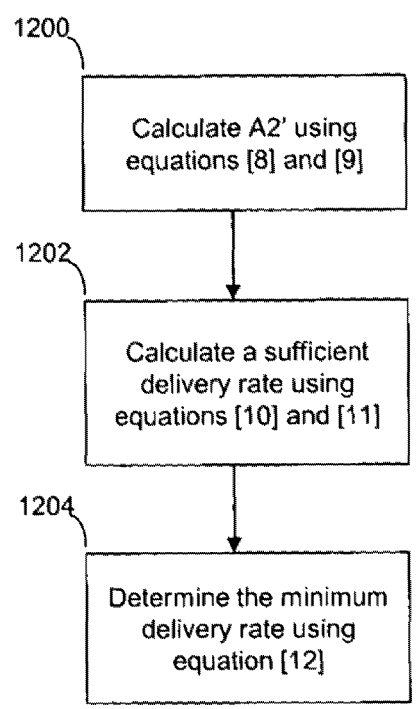
FIG. 12 is a flow chart showing the steps performed to determine the minimum required delivery rate using an improved interpolation method.

In step 1200 of FIG. 12, the minimum required delivery rate is estimated according to the earlier methods using equations 8 and 9. In step 1202 the sufficient delivery rate is estimated using equations 10 and 11. And in step 1204, the minimum delivery rate is estimated using equation 12.

Figure 13:
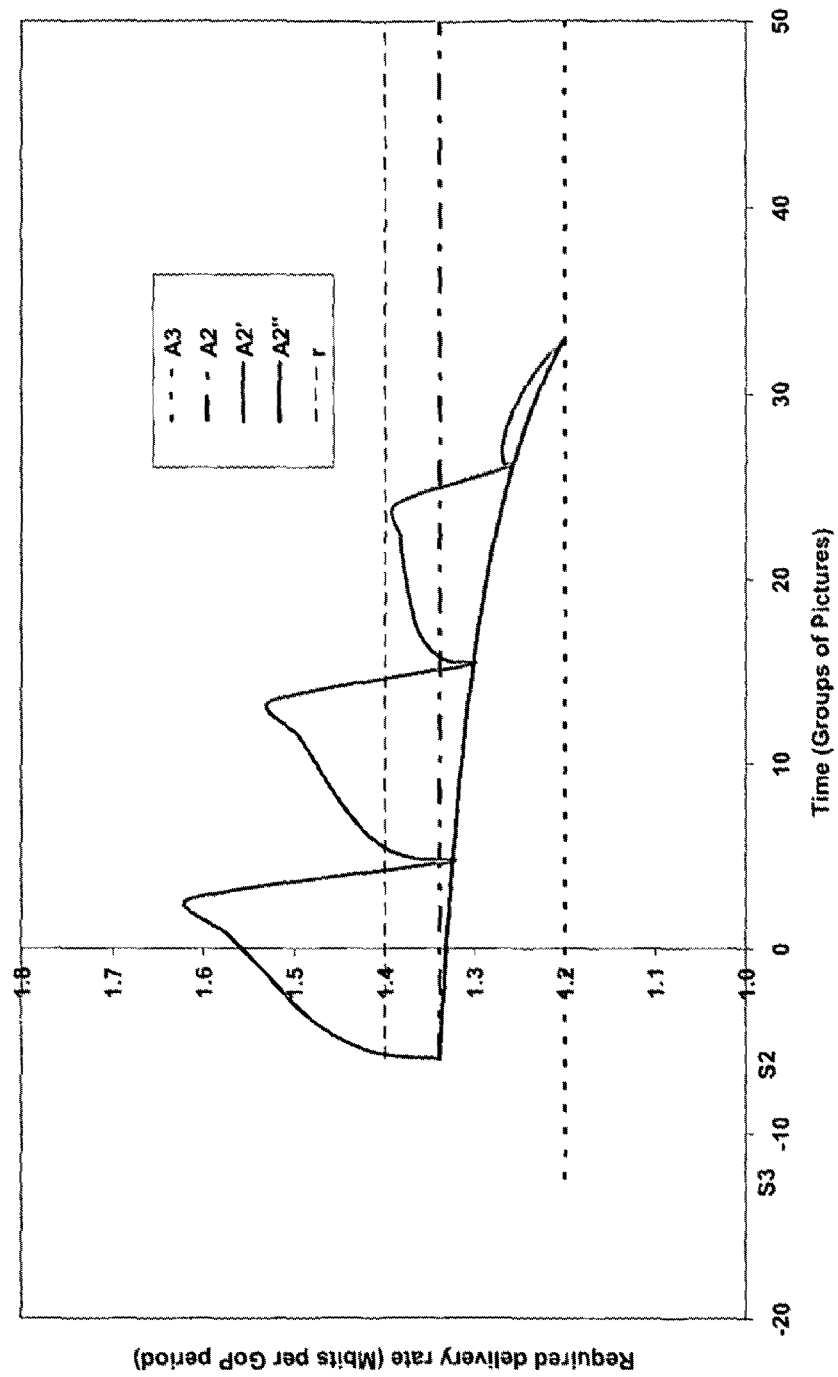
FIG. 13 is a graph showing how both the interpolated required delivery rate and the improved calculated required delivery varies with time when delivery is at a fixed rate greater than the actual required delivery rate.

An example is shown in FIG. 13, where the cumulative bit curve is as shown in FIG. 10. Actual delivery is at a constant rate of 1.4 MBits per group of pictures period, as shown by the line labelled 'r'. The curve labelled 'A2"' shows the delivery rate required as calculated by interpolation using the pre-calculated data with the highest bit rate and the pre-calculated rate required for zero start up delay using Equations 7 and 8. This curve is different to that of FIG. 11 because in this case actual delivery is at a fixed rate whereas in the previous case it was at the calculated required delivery rate. The curve labelled 'A2'"' shows the delivery rate required when using Equations 10 and 11. It can be seen that this is a smooth curve, accurately reflecting the fact the delivery is consistently at a rate faster than necessary. It is also always below the actual delivery rate r, hence indicating that the required rate is always less than the actual delivery rate, and hence there is no need to switch to a lower bit rate, lower quality video stream. Whereas if the required rate were to be deduced simply from interpolation, with the result being A2', it would be concluded at times that the actual delivery rate r were insufficient for delivery of the stream, and that a switch to a lower bit rate, lower quality video stream should be carried out. Such a switch would be unnecessary, and could be avoided by the use of the improved calculations of Equations 11 and 12.

Note that the curves labelled A2' and A2" in FIG. 13 stop when the calculated rates fall to the level of A3, the highest rate for which start up delay values have been pre-calculated. In practice start up delay values would have been pre-calculated for some lower rate A1, and from this point onwards, interpolation would be performed between the pre-calculated data for rates A3 and A1, and the delivery rate for zero start up delay would not be used.

The method for calculating the minimum required delivery rate can be summarised as follows. Firstly we encode a video sequence at multiple levels of quality as in step 402. Then in step 404, we pre-calculate for each group of pictures the delivery rate that would be needed for timely delivery of that group of pictures and all subsequent groups of pictures if no time is initially buffered at the decoder. Also in step 404, we select a set of delivery bit rates, and for each of these rates we pre-calculate the minimum amount of time (pre-load) that must be buffered at the decoder for timely delivery of that group of pictures and all subsequent groups of pictures. The pre-calculated data is provided to the decoder in step 702. Then during video delivery, interpolation is performed using these pre-calculated data according to Equations 8 and 9, and where applicable using Equations 11 and 12, to calculate a safe estimate of the minimum required delivery rate as shown in FIGS. 8 and 12.

After such calculation of the minimum delivery rate required for each quality of video encoding, the video streaming system (in a preferred example, the receiver) would determine, in consideration of the expected network throughput, which quality of video to transmit next. The expected network throughput may be estimated from past measurements of actual throughput or by other means. Other factors, such as the amount of data buffered at the receiver, may also be taken into account when making the decision of which quality of video to transmit next. For example, it may be decided not to switch to a higher quality if less than a threshold of data, such as that which would take five seconds to display, were buffered at the receiver, or it may be decided to switch to a lower quality if less than a threshold of data were buffered, regardless of how the expected network throughput compares to the delivery rate required for each quality of video encoding. The decision of which quality of video to switch to could be made as often as every group of pictures, as it is possible to change between the different encodings at the start of any group of pictures.

The decision to switch to a different quality stream is done by the bitstream switching module 228. The receiver 200 can send a request to the server 100 to ask it to start transmitting a different quality video stream selected (as chosen by the receiver). The server may immediately switch and transmit the new stream, which may be delayed until a suitable switching point such as at the start of a new GOP. The server can then send data to the receiver to indicate that a switch has been made, and also start transmitting the new video stream.

Whilst the above examples have been described with reference to the receiver 200 performing the calculations that determine the required minimum bit rates and when to switch streams, the server could alternatively perform the same. The requirement is that the server would need to know the preload at the receiver's buffer in order to perform the required calculations.

Furthermore, whilst reference is made to determining the pre-calculated data at intervals of a GOP, and determining the minimum bit rate required at various GOP positions, the invention can equally be based on any temporal position within the stream instead of GOP positions, such as some other suitable frame interval.

Exemplary embodiments of the invention are realised, at least in part, by executable computer program code which may be embodied in application program data provided for by the program modules at he server and receiver. When such computer program code is loaded into the memory of the server or receiver for execution by the respective processor, it provides a computer program code structure which is capable of performing at least part of the methods in accordance with the above described exemplary embodiments of the invention.

Furthermore, a person skilled in the art will appreciate that the computer program structure referred can correspond to the process flow charts shown in FIGS. 4, 7, 8 and 12 where each step of the flow chart can correspond to at least one line of computer program code and that such, in combination with the processor in the respective server or receiver, provides apparatus for effecting the described process.

In general, t is noted herein that while the above describes examples of the invention, there are several variations and modifications which may be made to the described examples without departing from the scope of the present invention as defined in the appended claims. For example, the invention could also be applied to the audio streams or other media streams instead of video. One skilled in the art will recognise modifications to the described examples.

The invention claimed is:

1. A method of transmitting a video sequence from a server to a receiver over a transmission link in a network, comprising:
(a) generating a plurality of video streams by encoding a video sequence at a respective plurality of quality levels;
(b) determining for each video stream a set of pre-calculated data comprising, for each of a plurality of temporal positions in the video stream, i) for each of a plurality of transmission rates, the minimum preload required at the receiver for timely delivery of the video stream from said temporal position to the end of the video stream, and ii) the transmission rate required for timely delivery of the video stream from said temporal position to the end of the video stream where no preload is present at the receiver, wherein the preload is the playout duration of the data buffered at the receiver, and timely delivery is such that no buffer underflow occurs at the receiver;
(c) transmitting one of the video streams to the receiver; and during transmission, (d) determining the current preload at the receiver, and for a video stream encoded at one of the plurality of quality levels;
   selecting from the set of pre-calculated data associated with the respective quality level a first minimum preload above and a second minimum preload below the current preload, wherein a first transmission rate is the transmission rate associated with the first minimum preload, and a second transmission rate is the transmission rate associated with the second minimum preload;
   calculating an intersection time as the time when the total number of bits delivered by the first and second transmission rates are equal when taking into account the respective first and second minimum preloads;
   calculating the number of bits delivered by the intersection time;
   calculating an acceptable delivery rate required for timely delivery of the stream as the number of bits delivered by the intersection time divided by the sum of the current preload and intersection time; and
after an elapsed time following step (d),
(e) calculating a sufficient delivery rate as equal to the difference between the number of bits delivered by the intersection time and the actual number of bits delivered during the elapsed time divided by the sum of the current preload and intersection time minus the elapsed time; and calculating a new acceptable delivery rate by repeating step (d); and
(f) determining the minimum required delivery rate to ensure timely delivery of the remainder of the stream as the minimum of the new acceptable delivery rate and the sufficient delivery rate.

2. A method according to claim 1, wherein the quality levels are fixed for each encoded video stream.

3. A method according to claim 1, wherein the quality levels are perceptual quality levels.

4. A method according to claim 1, wherein the receiver performs steps (d) to (f).

5. A method according to claim 1 wherein calculating the intersection time is determined as the difference between the product of the second preload and second transmission rate and the product of the first preload and the first transmission rate, wherein said first intersection time is equal to the difference between the products divided by the difference between the first and the second transmission rates.

6. A method according to claim 1 wherein calculating the number of bits delivered by the intersection time is determined as the product of the second transmission rate and the sum of the second preload and the intersection time, or the product of the first transmission rate and the sum of the first preload and the intersection time.

7. A method according to claim 1 further comprising (g) determining the actual transmission rate of the stream over the transmission link, and deciding whether to switch to a stream encoded at a different quality level based on the minimum required delivery rate compared to the actual transmission rate.

8. A method according to claim 1 wherein the temporal position is a position of a group of pictures.

9. A method of handling a video stream at a receiver, comprising:
   (a) receiving a set of pre-calculated data for a video stream encoded at a plurality of quality levels, said set comprising, for each of a plurality of temporal positions in the stream, i) for each of a plurality of transmission rates, the minimum preload required at the receiver for timely delivery of the sequence from said temporal position to the end of the video stream, and ii) the transmission rate required for timely delivery of the video stream from said temporal position to the end of the video stream where no preload is present at the receiver, wherein the preload is the playout duration of the data buffered at the receiver, and timely delivery is such that no buffer underflow occurs at the receiver;
   (b) receiving an encoded video stream; and during reception,
   (c) determining the current preload at the receiver, and for a video stream encoded at one of the plurality of quality levels;
     selecting from the set of pre-calculated data associated with the respective quality level a first minimum preload above and a second minimum preload below the current preload, wherein the first transmission rate is the transmission rate associated with the first minimum preload, and a second transmission rate is the transmission rate associated with the second minimum preload;
     calculating an intersection time as the time when the total number of bits delivered by the first and second transmission rates are equal when taking into account the respective first and second minimum preloads;
     calculating the number of bits delivered by the intersection time;
     calculating an acceptable delivery rate required for timely delivery of the stream as the number of bits delivered by the intersection time divided by the sum of the current preload and intersection time; and
   after an elapsed time following step (c)
   (d) calculating a sufficient delivery rate as equal to the difference between the number of bits delivered by the intersection time and the actual number of bits delivered during the elapsed time divided by the sum of the current preload and intersection time minus the elapsed time; and calculating a new acceptable delivery rate by repeating step (c); and
   (e) determining the minimum required delivery rate to ensure timely delivery of the remainder of the stream as the minimum of the new acceptable delivery rate and the sufficient delivery rate.

* * * * *